June 2, 1936.  J. A. DELANEY  2,042,883
LOCK SLOT SEAM AND LOCK SLOT
Filed May 20, 1935
Fig.1.  Fig.2.  Fig.3.
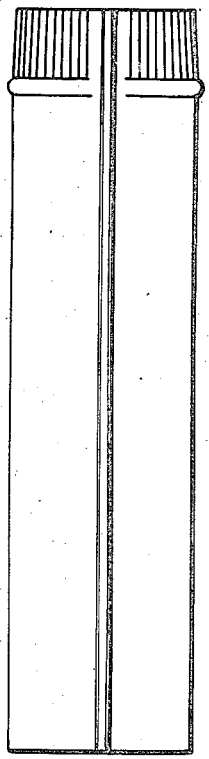
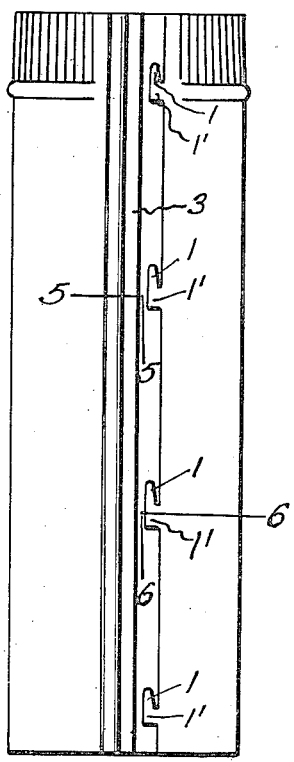
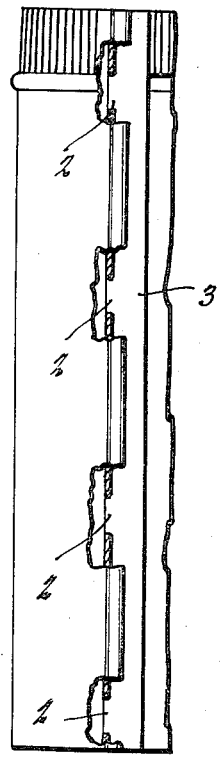
Fig.4.  Fig.7.  Fig.8.
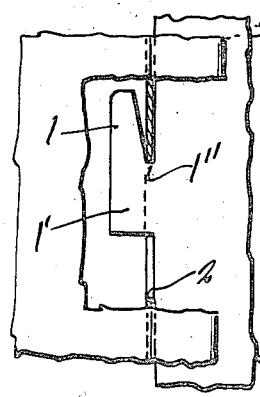
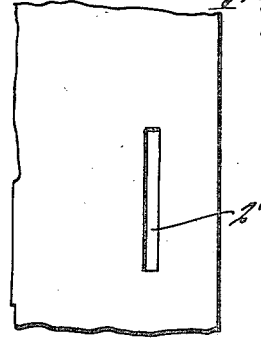
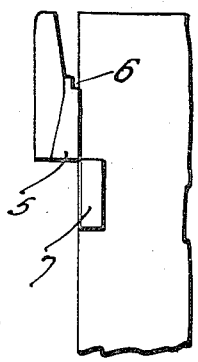
Fig.5.  Fig.6.
Fig.9.
Inventor
Joseph A. Delaney
By Thomas A. O'Brien
Attorney Patented June 2, 1936

2,042,883

UNITED STATES PATENT OFFICE 2,042,883

LOCK SLOT SEAM AND LOCK SLOT

Joseph A. Delaney, Jersey City, N. J.

Application May 20, 1935, Serial No. 22,466

3 Claims. (Cl. 138—74)

This invention relates to a lock slot seam and lock slot for connecting together adjacent edges of materials, such as in pipe construction, the general object of the invention being to provide a plurality of slots in one edge and a plurality of tongues at the other edge for interlocking with the slots, in such a manner that the tongues are placed in interlocking engagement with the slots or disengage from the slots by a longitudinal movement of one edge relative to the other.

Another object of the invention is to so form the locking means that the parts are locked together in such a manner that they will not yield, for instance, when the invention is used in pipe construction, the pipe will not expand or contract after the edges are fastened together and as it occurs by the locking means now in use due to the loose engagement of the projections with the slots and with the seams.

Another object of the invention is to so form the parts that they can readily be separated after being locked together so that when a pipe is set up for a customer, for instance, and the customer brings it back for any reason, the locking means can be disengaged and the material forming the pipe placed in its original position and placed back in stock so that it will not occupy as much space as it would if it was necessary to keep the pipe in its pipe form.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is an elevation showing the invention applied to a pipe.

Figure 2 is a similar view showing the edges of the pipe separated.

Figure 3 is a fragmentary elevation with parts broken away to show the slots.

Figure 4 is a fragmentary view with parts in section and parts broken away to show how a tongue engages a slot.

Figure 5 is a section on the line 5—5 of Figure 2.

Figure 6 is a section on the line 6—6 of Figure 2.

Figure 7 is a fragmentary view showing a slot in the material and where the slotted edge of the material is not to be folded or looped.

Figure 8 is a fragmentary elevation showing a modification where parts are provided for forming a double thickness of material adjacent the tongue for filling completely the slot after the tongue has been inserted therein.

Figure 9 is a fragmentary transverse sectional view showing how two edges can be connected together without folding or looping the slotted edge.

In this drawing the invention is shown in use for connecting together the edges of a pipe but it is to be understood that the invention can be used for connecting together edges of material used for other purposes than pipe construction and it can also be used for connecting a pipe section at one end to another pipe section.

As shown in this drawing I provide a plurality of tongues 1 at one edge of the material, each tongue including a base 1' which extends at right angles from the edge and the tongue part which substantially parallels the edge and extends at substantially right angles from the base part. The other edge is formed with a plurality of slots 2, one for each tongue, and each slot is elongated to an extent which will permit the tongue and its base to be inserted thereinto and then one edge moves relative to the other to cause an end wall of the slot to abut the shoulder 1'' formed at the juncture of the tongue part with the base part, as more particularly shown in Figure 4. The inner wall of the tongue part is preferably made so as to slope from its free end outwardly to the shoulder so as to facilitate the positioning of the tongues in the slots.

When a lock slot seam is used the slots 2 are formed in the bight of the U-shaped bent portion 3 of the slotted edge of the material, one limb of the U-shaped part being pressed against a portion of the inner face of the pipe as shown in Figure 5. Thus the space between the two limbs of the U-shaped portion receives the tongue carrying edge.

When the seam is not required the slots 2' are formed in the unbent edge portion, as shown in Figures 7 and 9 and the tongues 4 of the other edge are bent at right angles to pass through the slots, as shown in Figure 9 with the edges overlapping as also shown in Figure 9.

Where it is desirable to have the pipe fluidtight I make the parts fitting in each slot of double thickness, as shown in Figure 8. As shown in this figure the material cut to form the space between the tongue and the adjacent portion of the edge of the main part is bent over against the base of the tongue, as shown at 5, so that the inner portion of the base of the tongue is of double thickness and this part 5 has a notch 6 in its upper end, the bottom wall of which forms a part of the shoulder which bears against an end wall of the slot. A tab 7 is also formed on the edge of the main part below the tongue and this part 7 is bent over as shown in Figure 8. Thus these parts 5 and 7 make those portions which are located in a slot 2 of double thickness so as to fill the slot and thus prevent the escape of fluid through the slot.

As before stated the tongues are inserted in the slots and then one edge portion moved lengthwise with respect to the edge so as to cause one end wall of each slot to engage the shoulder of the tongue, as more particularly shown in Figure 4 which interlocks the edges together and there is no yield between the parts so connected together. This arrangement permits the parts to be readily separated when desired so that if a pipe, for instance, is set up in the store and then it is desired to place the pipe back in stock it is simply necessary to disengage the tongues from the slots and flatten out the material and place it back in stock. Thus the pipe forming material will take up but little room.

This invention enables the parts to be shipped and stored in nested condition and the edges can be easily and quickly fastened together to form a pipe or the like and when the pipe is used as a conduit for fluid and it is desired to make the pipe practically fluid-tight the parts 5 and 7 are used which make those portions in the slots of double thickness to fill the slots entirely and thus leave no openings for the escape of the fluid.

As before stated the invention can be used for connecting together the adjacent ends of two pipes or the like by providing one end with the slots and the other end with the tongues and moving one pipe circumferentially to engage and disengage the tongues with the slots.

What is claimed is:—

1. A pipe construction comprising a sheet of material having a row of spaced slots adjacent one edge, a plurality of tongues projecting from the other edge, each tongue including a base and a tip, the base of each tongue having a reinforced portion to provide said base with a thickness equal to the width of its companion slot, and a tab formed on one edge below the base of each tongue to increase the thickness of said edge to equal the thickness of the base, whereby when each slot engages its companion tongue the slot is entirely closed against the escape of fluid.

2. A pipe construction comprising a sheet of material having a row of spaced slots adjacent one edge, a plurality of tongues projecting from the other edge, each tongue including a base and a tip, said tip being formed by partly cutting away the inner portion of the tongue, said cut away portion being bent over against the base of the tongue to provide the same with a thickness equal to the width of its companion slot, and a tab formed on one edge below the base of each tongue and bent against the material adjacent said edge to provide said material with a thickness equal to the thickness of the base of each tongue, whereby when each slot engages its companion tongue the slot is entirely closed against the escape of fluid.

3. Means for connecting together a pair of edge parts comprising a tongue projecting from the edge of one part, the other edge part having an elongated slot therein, said tongue including a base and a tip, said tip being formed by partly cutting away the inner portion of the tongue, said cut away portion being bent over against the base of the tongue to provide the base with a thickness equal to the width of the slot, and a tab formed on one edge part below the base of the tongue and bent against said edge part to provide said edge with a thickness equal to the thickness of the base of the tongue, whereby when the slot engages the tongue the slot is entirely closed against the escape of fluid.

JOSEPH A. DELANEY.